UNITED STATES PATENT OFFICE.

JULIUS G. POHLE, OF MORRISANIA, AND JAMES N. CROW, OF MOTT HAVEN, NEW YORK.

IMPROVED MODE OF REMOVING STAINS FROM GLASS.

Specification forming part of Letters Patent No. 37,975, dated March 24, 1863.

*To all whom it may concern:*

Be it known that we, JULIUS G. POHLE, of Morrisania, and JAMES N. CROW, of Mott Haven, both in the county of Westchester and State of New York, have invented a new and Improved Composition for Removing the Iridescences or Peacock-Colored Stains from Glass; and we do hereby declare that the following is a full, clear, and exact description of the same.

The object of this invention is to remove the iridescences or peacock-colored stains frequently appearing on window-glass, &c., such glass being known in the trade as "stained glass" or "burnt glass," said stains being sometimes designated as "glass-rust," or known by various other designations.

The invention consists in the employment or use of hydrofluoric acid in the liquid form, either pure or mixed with other substances or material, for the purpose of removing the iridescences or stains from glass by rubbing said stains with a rag dipped in the solution, or by dipping the glass itself in the solution, or by applying said solution to the iridescent surface in any other desirable manner.

The action of hydrofluoric acid on silicates—such as glass—has been known long ago, and said acid has been and is now frequently used for etching glass. When it acts on the glass in the gaseous form the surface of the glass, or that portion of the same which comes in contact with the hydrofluoric-acid gas, is dimmed. It loses its transparency, and in this state the acid could not be used for removing stains from glass; but when it is applied in the liquid form it affects the surface without dimming the same, and it serves admirably for the purpose of restoring iridescent glass. The iridescences of glass occurs very frequently, particularly when the glass is stored in a damp place; and hitherto the only means for restoring the same have been to rub it with dry woolen rags for a long time; or when only a portion of the surface was stained such portion or portions were removed by cutting the panes down.

By the use of our solution the iridescent glass can be restored in twenty-five to thirty minutes, and no portion of the glass has to be wasted.

*Directions for removing iridescent stains, &c., from window-glass.*—Apply the hydrofluoric acid to the stains by means of a woolen or cotton rag thoroughly saturated with it, or by dipping the glass into the acid, or in any other suitable way to bring the acid in contact with the glass. Let the acid remain on the glass for about one minute, be the same more or less, according to the depth of the stain. Then rinse off with water and let it dry.

*Caution.*—As the hydrofluoric acts on all materials having silica in their compositions, and also on all the ordinary metals, with the exceptions of lead, platina, and gold, it is obvious that these should not be used as a receptacle for the acid. The most suitable vessels for holding the acid are those made of lead, gutta-percha, vulcanized caoutchouc wood, or metallic vessels lined or coated with compositions of various resinous and fatty substances, such as asphaltum and tallow, beeswax, shellac, &c.

What we claim as new, and desire to secure by Letters Patent, is—

The application of the within-described solution for the purpose of removing or eradicating stains or burns from glass, substantially in the manner set forth.

JULIUS G. POHLE.
JAMES N. CROW.

Witnesses:
W. HAUFF,
J. W. COOMBS.